(12) United States Patent
Burd et al.

(10) Patent No.: US 10,766,619 B2
(45) Date of Patent: Sep. 8, 2020

(54) UPPER MOUNTING APPARATUS FOR RETAINING AIRCRAFT MONUMENTS

(71) Applicant: B/E Aerospace, Inc., Winston-Salem, NC (US)

(72) Inventors: Peter John Leslie Burd, Carmarthenshire (GB); Neil R. Elshaw, Gosport (GB); Cheeyuan Poey Lo, St. Albans (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 412 days.

(21) Appl. No.: 15/648,200

(22) Filed: Jul. 12, 2017

(65) Prior Publication Data
US 2018/0016009 A1    Jan. 18, 2018

Related U.S. Application Data

(60) Provisional application No. 62/361,460, filed on Jul. 12, 2016.

(51) Int. Cl.
| | |
|---|---|
| *B64D 11/00* | (2006.01) |
| *B64D 9/00* | (2006.01) |
| *F16B 5/02* | (2006.01) |
| *F16B 5/00* | (2006.01) |
| *B21D 53/92* | (2006.01) |
| *B64F 5/00* | (2017.01) |

(52) U.S. Cl.
CPC ............. *B64D 9/003* (2013.01); *B21D 53/92* (2013.01); *B64F 5/00* (2013.01); *F16B 5/0088* (2013.01); *F16B 5/0225* (2013.01); *Y10T 403/75* (2015.01)

(58) Field of Classification Search
CPC ................ B64D 11/0007; B64D 11/00; B64D 2011/0046; B64D 11/003
See application file for complete search history.

(56) References Cited

U.S. PATENT DOCUMENTS

| | | | | |
|---|---|---|---|---|
| 6,883,753 B1 * | 4/2005 | Scown | ...................... | B64C 1/06 |
| | | | | 244/118.1 |
| 7,121,510 B2 | 10/2006 | Ritts | | |
| 8,403,266 B2 * | 3/2013 | Fokken | .................. | B61D 17/18 |
| | | | | 244/131 |
| 8,636,249 B2 * | 1/2014 | Conen | .................. | B64D 11/003 |
| | | | | 244/118.1 |
| 10,137,974 B2 * | 11/2018 | Ahlen | .................. | F16M 13/022 |
| 10,329,005 B2 * | 6/2019 | Nandalochana | .......... | B64C 1/06 |
| 2016/0347437 A1 * | 12/2016 | Mamushkin | ............ | B64C 1/061 |

* cited by examiner

*Primary Examiner* — Brian M O'Hara
(74) *Attorney, Agent, or Firm* — Suiter Swantz pc llo

(57) ABSTRACT

In an illustrative embodiment, an upper monument attachment system is provided for retaining aircraft monuments, the system including a first support, a second support, and a joiner connecting a first end of the first support and a first end of the second support, a stay having a first end pivotably connected to the joiner, a tie rod configured to connect the joiner to an attachment point of the aircraft, a first rail having a first base configured to connect to an upper surface of the monument and a first facing configured to connect to the first support and the second support, and a second rail having a second base configured to connect to the upper surface of the monument and a second facing configured to connect to a second end of the stay.

18 Claims, 6 Drawing Sheets

UPPER MOUNTING APPARATUS FOR RETAINING AIRCRAFT MONUMENTS

CROSS-REFERENCE TO RELATED APPLICATIONS

This application claims priority from U.S. Provisional Application No. 62/361,460, filed Jul. 12, 2016, the contents of which are incorporated by reference in their entirety.

BACKGROUND

Commercial passenger carrying aircraft commonly have storage or compartment structures (frequently referred to by the generic term "monuments") installed on the aircraft. These structures are used in a variety of ways, such as storage of clothing and other passenger belongings, electronic entertainment centers, sleeping quarters for the crew, work stations, bar units, lavatories, and galleys used to provide in-flight catering service to passengers.

Traditionally, these monuments have been manufactured as assemblies of multi-layered composite panels or other flat sheet materials to form standalone structures that may then be secured to the aircraft and connected to items such as wiring looms and electrical components, ventilation and air extraction ducts, hoses, and component mountings, decor panels, hinges, back stops, galley insert equipment interfaces, access panels, ducts, sliders and drawer runners, electronic entertainment devices, grilles, and general equipment retainers. Some of these items fall into the broad categories of electrical, plumbing, or air handling equipment.

Monuments are generally secured or fixed to the aircraft at floor level or from above. Securement devices and systems may need to be adjustable as aircraft are repurposed or reconfigured on occasion, and the monuments must be relocated. As such, securement devices and systems may also have to withstand certain static and dynamic loads to maintain monument position while in service and in flight.

Federal regulations dictate certain standards for static load handling, load sharing and dynamic load handling. 14 CFR 25.561 (incorporated herein by reference) provides that aircraft structures such as bulkheads must be able to withstand a 9G forward static load. It is understood in the industry that if structures are spaced within one inch of one another, it must be demonstrated that the structures are capable of sharing loads during normal use and emergency landing conditions.

SUMMARY OF ILLUSTRATIVE EMBODIMENTS

The forgoing general description of the illustrative implementations and the following detailed description thereof are merely exemplary aspects of the teachings of this disclosure, and are not restrictive.

In an illustrative embodiment, an upper monument attachment system is provided for retaining aircraft monuments, the system including: a bipod having a first support, a second support, and a joiner connecting a first end of the first support and a first end of the second support; a stay having a first end pivotably connected to the joiner of the bipod; a tie rod configured to connect the bipod to an attachment point of the aircraft; a first rail having a first base configured to connect to an upper surface of the monument and a first facing configured to connect to the first support and the second support of the bipod; and a second rail having a second base configured to connect to the upper surface of the monument and a second facing configured to connect to a second end of the stay.

In an illustrative embodiment, the second rail is positioned at a predetermined distance apart from the first rail and parallel to the first rail.

In an illustrative embodiment, the first support, the second support, and the stay are collectively configured to form a triangulated support.

In an illustrative embodiment, the upper monument attachment system includes a plate connected to the upper surface of the monument, and the first support, the second support, the first rail and the second rail are secured to the plate.

In an illustrative embodiment, the tie rod includes shock absorber.

In an illustrative embodiment, the upper monument attachment system includes connections the between the bipod and the first rail, and between the stay and the second rail are secured by a number of quick-release pins.

In an illustrative embodiment, the triangulated support is configured to maximize strength and rigidity per unit mass.

In an illustrative embodiment, the upper monument attachment system 160 is configured to remove at least a portion of a load supported by a lower monument.

In an illustrative embodiment, the second rail is a duplex rail having a gap along a length of the second rail, and the second end of the stay is configured to be secured within the gap of the second rail.

In an illustrative embodiment, the attachment point includes a shock absorber configured to allow for a controlled range of motion of at least an upper portion of the monument.

In an illustrative embodiment, the stay is fixed to the bipod forming a fixed tripod.

In an illustrative embodiment, each of the first support and the second support are configured to be adjusted forming an adjustable tripod.

In an illustrative embodiment, each component of the upper monument attachment system is electrically bonded together to provide a low resistance path from the attachment point, the monument, and to an electrical ground.

In an illustrative embodiment, the upper monument attachment system includes a grounding cable connected to the bipod.

In an illustrative embodiment, the attachment point of the aircraft includes at least one of an aircraft fuselage, a cabin ceiling, and a bulkhead.

In an illustrative embodiment, the first rail is a duplex rail having a gap along a length of the first rail, and a second end of the first support and a second end of the second support are each configured to be secured within the gap of the first rail.

In an illustrative embodiment, distal ends of each of the first support and the second support are configured to fit within the gap of the first rail.

In an illustrative embodiment, the upper monument attachment system includes at least one track member, and the first rail is connected to the at least one track member using a number of track fasteners allowing a position of the first rail to be adjusted by moving along a length of the least one track member.

In an illustrative embodiment, the at least one track member is formed into a surface of the upper surface of the monument.

In an illustrative embodiment, the at least one track member comprises a number of depressions, and each track fastener includes a spring mechanism configured to mate with one of the number of depressions in the at least one track member such that, upon positioning, the spring mechanism is engaged to lock the first rail into position.

In an illustrative embodiment, the tie rod comprises at least one clevis configured to rotate and pivot about the bipod.

In an illustrative embodiment, the tie rod further comprises a body connected to the at least one clevis at a first end of the body, and a second clevis connected to a second end of the body and configured to rotate and pivot about the attachment point of the aircraft.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale.

Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
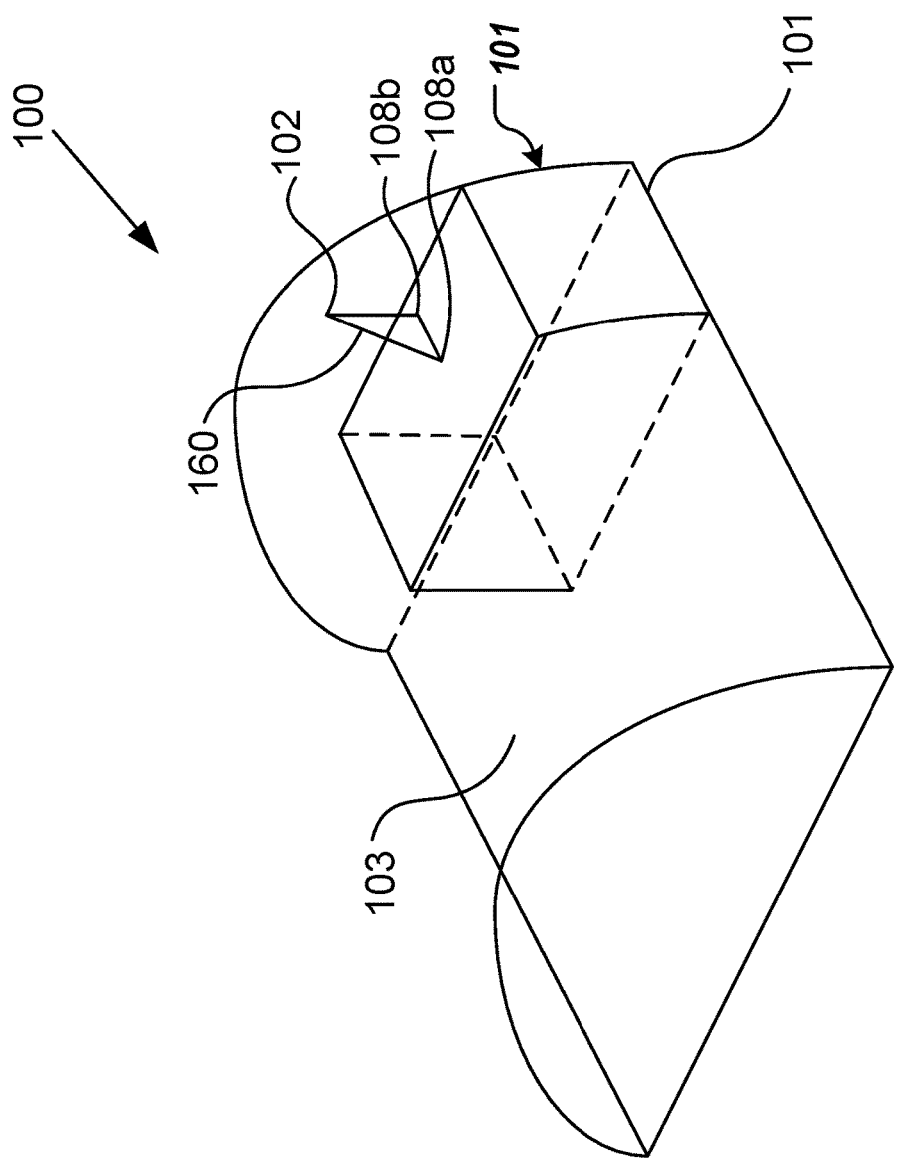
FIG. 1 is a perspective view of a section of an aircraft including a monument secured to an upper attachment point of the aircraft using an upper monument attachment system, according to an example.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

The present disclosure relates to upper monument attachment apparatus, systems, and methods for use. Aircraft monuments, in some examples, can include galley monuments for food preparation, storage, and service, lavatory monuments encasing toilet and sink units, crew break area monuments for rest periods during long flights, and storage monuments for providing passenger and/or crew storage regions.

FIG. 1 is a perspective view of a section of an aircraft monument 101 connected to a section of floor 103 and an attachment point 102 on an upper cabin structure of an aircraft 100 using an upper monument attachment system 160, according to example embodiments described below. The monument 101 may be positioned with a longitudinal axis perpendicular to a longitudinal axis of the aircraft. In other configurations, the monument 101 may be positioned with a longitudinal axis parallel to the longitudinal axis of the aircraft.

Aircraft monuments are generally designed for releasable installation within an cabin area of the aircraft. As illustrated in the example cabin layout of FIG. 1, the monument 101 may be secured to the aircraft by a variety of securement systems 130, further described by related U.S. patent application Ser. No. 15/648,165 entitled "Aircraft Monument Floor Mounting System" and filed Jul. 12, 2017, hereby incorporated by reference in its entirety, at various attachment points on the floor 103 of the aircraft.

In accordance with the teachings herein, monuments may be further secured to the aircraft by at least one upper monument attachment system 160. Each upper monument attachment system 160 may be connected to two monument attachment points 108a-b and an attachment point 102 on an adjacent aircraft cabin structure to form a triangulated joint with the monument that supplements connections between a number of lower attachment points and a number of lower mounting positions of the monument secured by one or more types of lower monument securement systems. Triangulating to two positions on the upper surface of the monument, for example, can distribute force exerted upon the upper surface of the monument. In other embodiments, the upper monument attachment system 160 may be connected to at least one monument attachment point 108a-b on the monument and at least two points on one or more adjacent aircraft cabin structures in a triangulated manner. By connecting to two points on adjacent cabin structure(s), for example, movement of an upper portion of the monument may be better managed. Further, in the circumstance where a single connection to an upper cabin structure is not adequately strong, anchoring to two different upper cabin structures may increase the mounting strength.

The upper monument attachment system 160, in some embodiments, is designed to rigidly retain the monument from movement. This can be especially important when the monument is particularly heavy or otherwise has a high center of gravity. In other embodiments, the upper monument attachment system 160 may be designed to limit monument movement. In providing some movement, for example, the upper monument attachment system 160 may relieve stresses on lower monument structures and/or monument attachment points while controlling movement.

In some embodiments, monuments may be modular such that an upper portion is not necessarily rigidly or strongly connected to the lower portion. For example, an upper galley portion of warming, cooling, and or storage units may be physically separable (or physically separate) from a lower galley portion of storage and preparation units, such that the lower galley portion is not designed to withstand full loads from the upper galley portion. Upper and lower monument portions, generally, may be designed by different manufacturers and thus not necessarily adapted for load sharing. The upper monument attachment system 160 may remove at least a portion of the load supported by the lower monument portion in these circumstances.

The upper monument attachment system 160 may be developed to retain at least an upper section of a given monument in view of emergency situation loads upon the attachment system 160. For example, while in normal use scenarios lower anchoring systems may be adequate to retain the monument, in the event of a rapid deceleration (e.g., as would occur during an emergency landing), for example, the upper monument attachment system 160, alone or in combination with additional retention structures, may be designed to withstand dynamic load force caused by the emergency situation.

Figure 2:
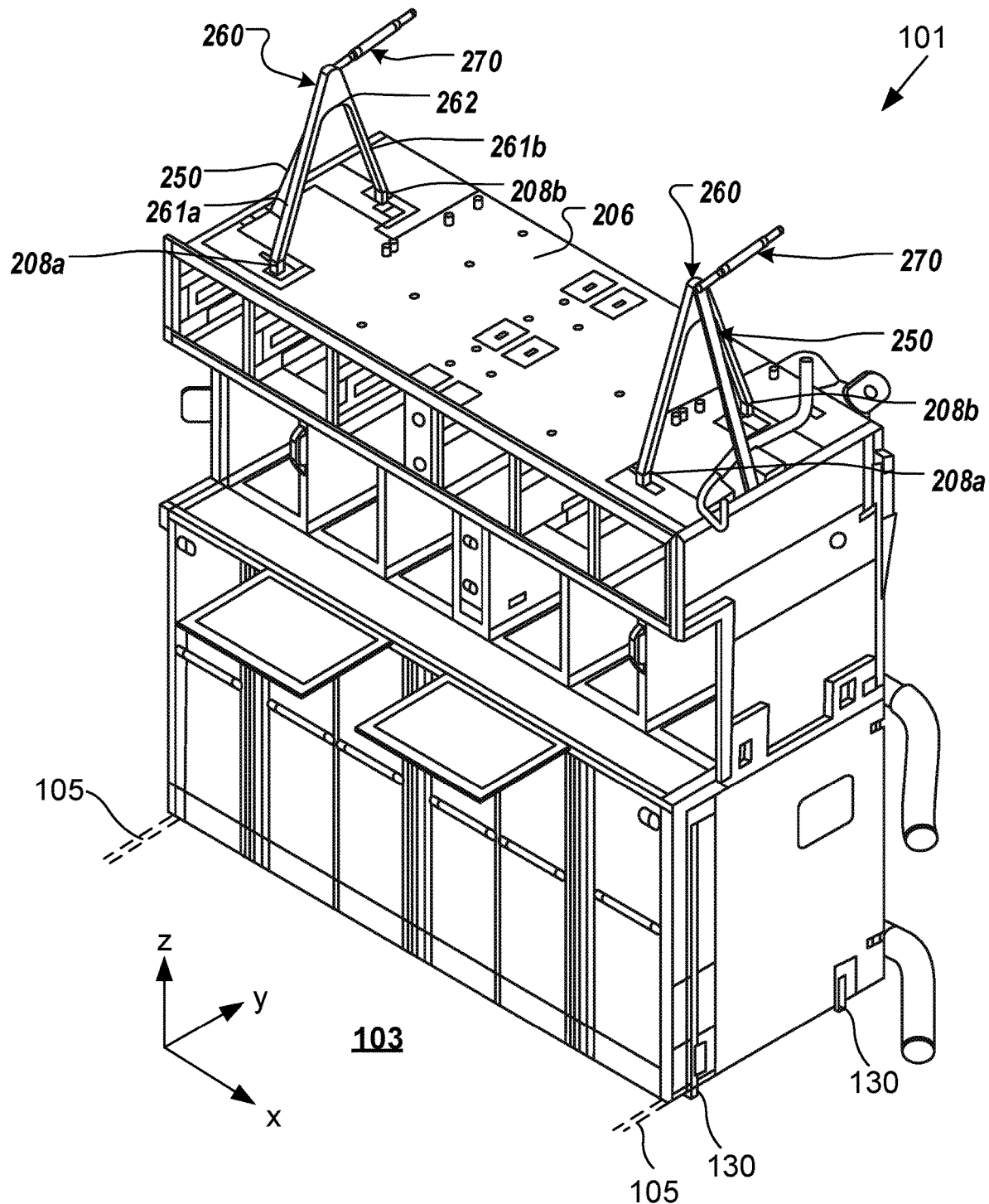
FIG. 2 is a perspective view of an upper monument attachment system secured to a top panel of a monument, according to an example.

FIG. 2 is a perspective view of an example galley monument 101 having an upper surface or top panel 206 configured to be secured to the aircraft using at least one upper monument attachment system 160. The at least one upper monument attachment system 160 can be configured to connect the galley monument 101 to secure or rigid structures within the aircraft cabin or to fixed airframe mounting points located above the top panel 206 (relative to a z-axis), according to an example.

In some implementations, the upper monument attachment system 160 may have a triangulated structure to maximize strength and rigidity per unit mass. Further, a position of the upper monument attachment system 160 relative to the top panel 206, and thus the galley monument 101, may be adjustable along at least one axis.

As shown in FIG. 1, the galley monument 101 may be positioned with a longitudinal axis perpendicular to a direction of flight of the aircraft. Returning to FIG. 2, the top panel 206 of the galley monument may be connected to one or more upper galley attachment systems 160, each upper galley attachment system 160 including a bipod 260 having a first support 261a, a second support 261b, a joiner 262 connecting the first support 261a and the second support 261b, and a stay 250 having a first end connected to the bipod 260 and a second end connected to the galley monument 101, and a tie rod 270 configured to connect the bipod 260 to the attachment point 102 (shown in FIG. 1) on an aircraft cabin structure. In an aspect, connection between the bipod 310 and the tie rod 270 is configured to allow for expected structural movement and turbulence from the aircraft. In an example, the stay 250 is configured to provide lateral support as part of the upper galley attachment system 160. In some implementations, the stay 250 can be fixed to the bipod 260 forming a fixed tripod. As shown, in some implementations, the stay 250 can preferably be a separate piece to aid installation and allow for adjustments. In some implementations, each support forming the bipod can be an individual component (not shown) forming a tripod, similar to the stay 250. In some implementations, the galley monument 101 can be a centerline galley monument in a flex zone of the aircraft. In an example, the centerline galley monument can be secured with an upper monument attachment system including an adjustable tripod assembly with adjustable supports to the bipod and the stay.

In an example, the supports 261a-b can be secured to attachment points 208a-b on the top panel 206. In some embodiments, the attachment points 208a-b can have shock absorbers configured to allow for a controlled range of motion of at least the upper portion of the galley monument 101. In some examples, the shock absorbers are designed using one or more spring elements. In a particular example, the shock absorbers include gas compression springs. The attachment points 208a-b, in some embodiments, include eccentric fasteners to allow for small adjustments in attachment location. The eccentric fasteners, for example, may provide for lateral adjustment of each attachment point 208a-b of at least one half inch, between one half inch and 1.5 inches, or up to 3 inches in lateral adjustment range.

In an example, the joiner 262 can connect the first support 261a and the second support 261b at an angle between 30-60°, however, the angles may vary depending on galley orientation and location.

In some implementations, one or more shock absorbers can be incorporated into the tie rod and configured to allow for a controlled range of motion of at least the upper portion of the galley monument 101. In an example, the one or more shock absorbers can be configured to absorb movements and sudden shocks such as from turbulence or rough landings. In another example, the tie rod can be replaced by a circular ring shock absorber (not shown).

Figure 3A:
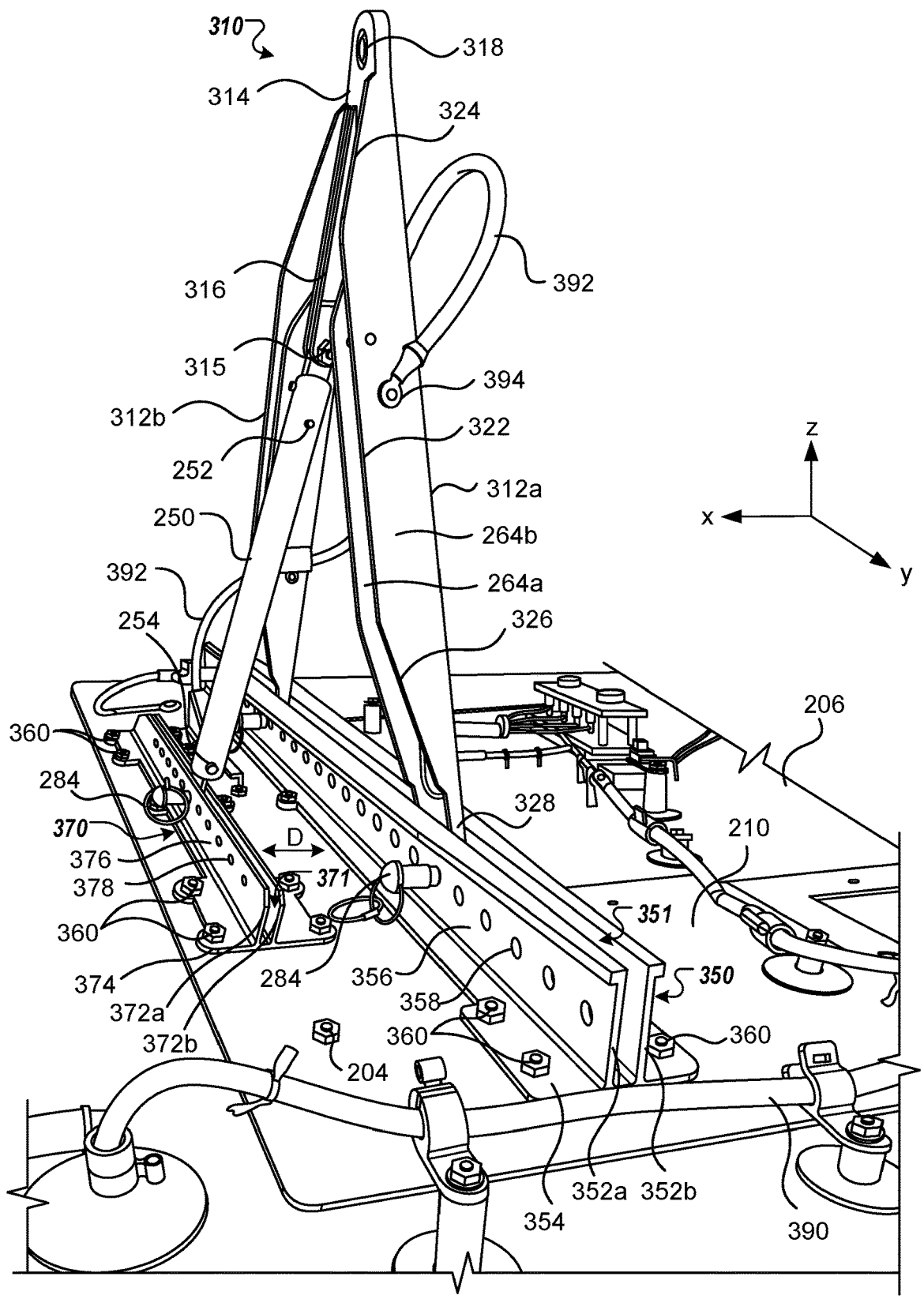
FIGS. 3A-3B illustrate various views of an upper monument attachment system secured to a plate connected to the top panel of the monument, according to an example.
Figure 3B:
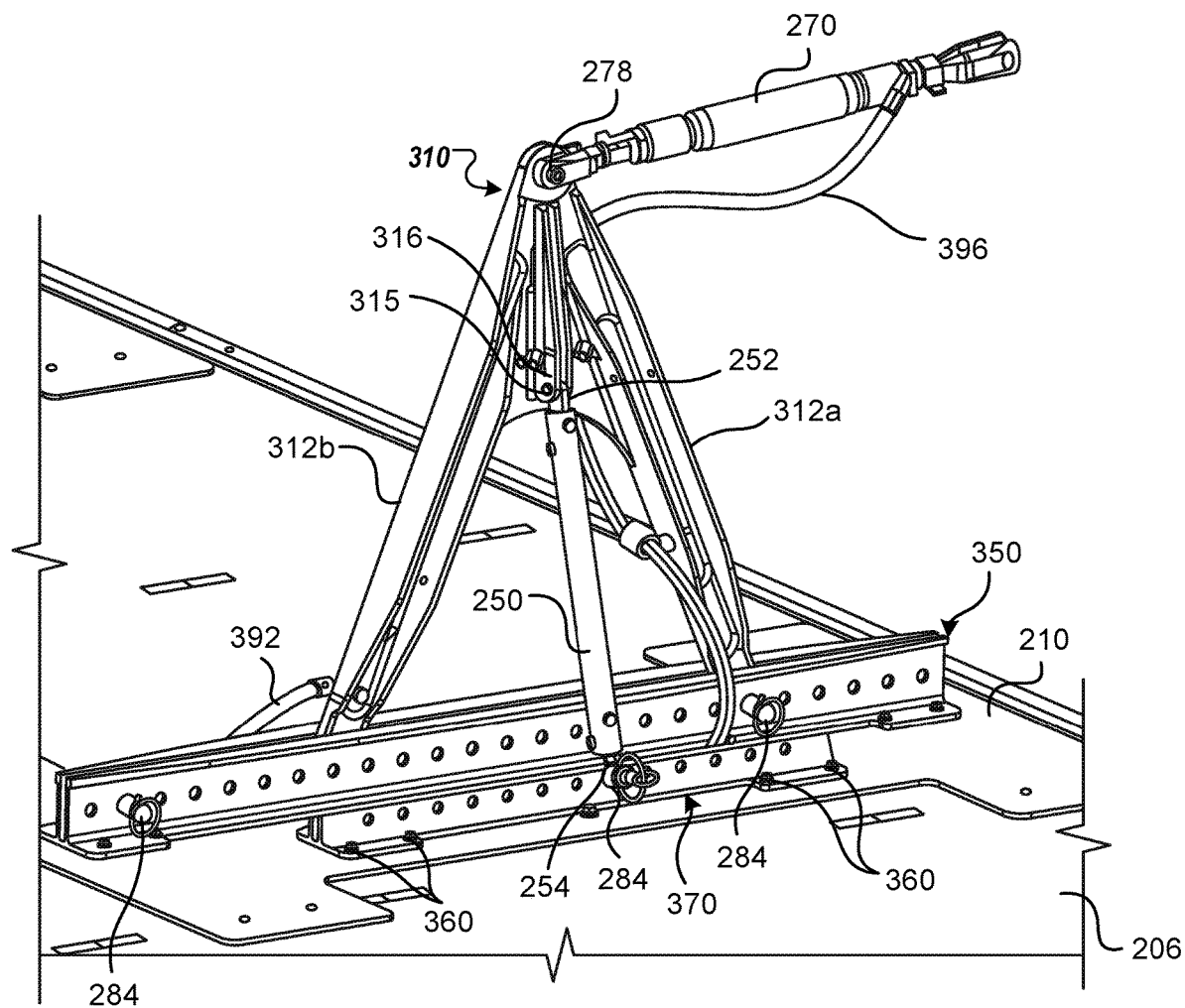

FIGS. 3A-3B illustrate views of the upper monument attachment system 160 attached using a fixed rail system, according to an example embodiment. In an example, the upper monument attachment system 160 can include a bipod 310 having a first support 312a, a second support 312b, and a joiner 314 connecting the first support 312a and the second support 312b. The bipod 310 can have an attachment aperture 318 configured to receive a connector to the tie rod 270 according to an example. In some implementations, each support 312a-b of the bipod has an inner flange 264a and an outer flange 264b. Each flange 264a-b can have a wide section 322, a proximal tapered section 324, and a distal tapered section 326 having a tapered distal end 328. In an example, each section of the flange 264a-b can be configured to provide structural support and rigidity in one or more axis. A plate 210 may be connected to the top panel 206 of the galley monument 101 using a number of fasteners 204 for mounting the upper monument attachment system 160. In other embodiments, the top panel 206 of the monument 101 may include a built-in attachment point, for example including fastener apertures for receiving fasteners for securing the upper monument attachment system 160. In an example, a total amount of fore and aft movement is 13".

As shown in FIGS. 3A-3B, the upper monument attachment system 160 can further include a first rail 350 positioned along a y-axis of the top panel 206 of the galley monument 101 and a second rail 370 separated by a distance D and parallel to the first rail 350. In some embodiments, the first rail 350 is a duplex rail including a first rail section 352a and a second rail section 352b separated by a gap 351 and connected by a base 354. The first rail 350 can be secured to the top panel 206 via the plate 210 using a number of fasteners 360 along the base 354 according to an example. Each of the first rail section 352a and the second rail section, in some implementations, 352b have a facing 356 including a number of apertures 358 which are aligned between rail sections 352a-b.

In some embodiments, the distal ends 328 of each of the first support 312a and the second support 312b are configured to fit within the gap 351 of the first rail 350 and an aperture on each of the distal ends 328 of the first support 312a and the second support 312b is configured to align with the apertures 358 of the rail sections 352a-b. The duplex rail design supports the first support 312a and the second support 312b from each side, providing increased stability. Further, the duplex rail design may work to spread the load on each of the first rail 350 and the second rail 370.

In some embodiments, the second rail 370 is a duplex rail including a first rail section 372a and a second rail section 372b separated by a gap 371 and connected by a base 374. In an example, the second rail 370 can be secured to the plate 210 using a number of fasteners 360 along the base 374. Each of the first rail section 372a and the second section rail 372b may have a facing 376 including a number of apertures 378 which are aligned between rails 372a-b.

In other embodiments, the first rail 350 and/or the second rail 370 is a single rail rather than a duplex rail. In a single rail design, for example, each of the first support 312a and the second support 312b may connect to the single rail. In some embodiments, the first support 312a and/or the second support 312b may include a split distal end such that two sides of the support 312a or 312b would surround the single rail and provide for fastening through 3 apertures (apertures in the two sides of the first support 312a and/or 312b and the aperture in the rail itself). In this alternate design, the rails may be lighter and less expensive to manufacture than a split rail.

In further embodiments, rather than a rail having apertures aligned parallel to a side of the monument 101, a mounting track similar to a floor mounting track may be provided with apertures aligned perpendicular to the top 206 of the monument 101. In this configuration, for example, the distal ends of the first support 312a and/or the second support 312b may include mating components to connect with the mounting track.

Connections between the bipod 310 and the first rail 350, and between the stay 250 and the second rail 370 may be secured by a number of connectors. For example, a quick release pin 284 such as a pit pin may be provided at each connection to secure each of the first support 312a and the second support 312b to the first rail 350. In another example, a nut and bolt may be used to connect the first support 312a and the second support 312b to the first rail 350.

In some implementations, the bipod 310, the stay 250, and the tie rod 270 are each formed from an aluminum alloy. In further implementations, the bipod 310, the stay 250, and the tie rod 270 may each be formed from components including carbon composite, aluminum, and/or stainless steel. In an example, the bipod 310 and the tie rod 270 may each be made of a metal configured to connect to a ground of an electrical system.

In some implementations, the upper monument attachment system 160 can be used for grounding the monument 101. In an aspect, all metallic items on the galley monument are be electrically bonded together to provide a low resistance path to earth. In an example, an electrical cable 390 attached to a portion of the galley monument 101 can be grounded to a grounding cable 392 and connected to the bipod 310 at a contact 394 (See FIG. 3A). In another example, the tie rod 270 can be grounded to the monument 101 and the bipod 310 using a grounding cable 396.

Figure 4:
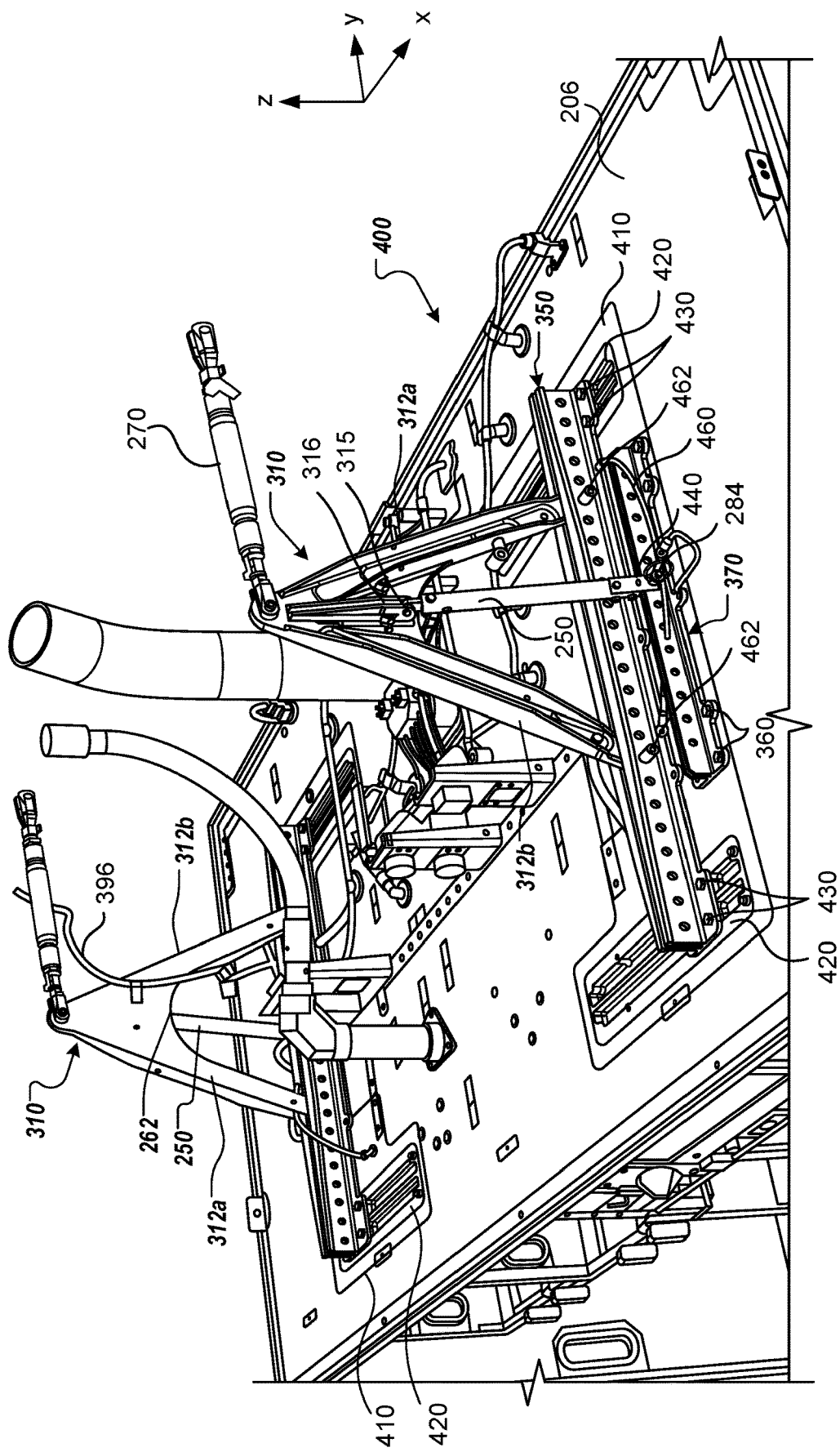
FIG. 4 is a perspective view of an upper monument attachment system including a plate having a track configured to distribute loads on an upper surface of the monument and to allow lateral movement of the monument attachments, according to an example.

As shown in FIG. 4, in some embodiments, an upper monument attachment system 400 includes a fully adjustable rail installation used to secure a centerline flex zone galley monument. In an example, the upper monument attachment system 400 includes at least one track member 420 configured to support the upper monument attachment system 400 while allowing portions of the upper monument attachment system 400 to be moved closer together or further apart. In an example, the upper monument attachment system 400 allows for adjustment of fore and aft movement by 1" increments. The track member(s) 420, for example, may be used to distribute loads on the top panel 206 of the monument 101 according to an example. Similarly as above, the upper monument attachment system 400 can include the bipod 310, the stay 250, the tie rod 270, the first rail 350, and the second rail 370. The track member(s) 420, in some implementations, are built into a plate 410. In other implementations, the track member(s) 420 are connected to one of the plate 410 and the top panel 206 of the monument 101. In further implementations, the track member(s) 420 may be built into the top panel 206. For example, the track member(s) 420 may be cured into the top panel 206 at the time of manufacture. In this manner, the track member (s) 420 may be securely connected to the top panel 206 while reducing overall weight by removing the need for the plate 410 and/or fasteners for connecting the track member(s) 420 to the top panel 206.

The first rail 350 may be connected to the track member(s) 420 using a number of track fasteners 430 allowing a position of the first rail 350 relative to the second rail 370 to be adjusted by moving the first rail 350 along a length of the track 420. For example, the track fasteners 430 may include spring pins configured to mate with one of a series of depressions in the track 420 such that, upon positioning, the spring mechanism may be engaged to lock the first rail 350 into position. The bipod 310 may further be connected to the first rail 350, such that a position of the bipod 310 may be adjusted relative to a position of the stay 250 by adjustment of the first rail 350 along the track member(s) 420. In an example, the track 420 can be similar to a seat type mounting track which employs a domed depression on an underside of a slotted rail and fixes with a mushroom shaped head that locates in the depression. In another example, dual rectangular blocks can be used to positively lock the rail, using the same principal as the seat type mounting track, in a fixed position.

In other embodiments, both the first rail 350 and the second rail 370 are designed for adjustment along the track member(s) 420. For example, this would allow for shifting of the positioning of the upper monument attachment system 160 to compensate, for example, for differences in mounting locations on upper cabin structure(s) while maintaining a desired triangulation of the stay 250 relative to the bipod 310. In this example, a distance between the first rail 350 and the second rail 370 may be maintained, for example, through a connector between the two rails 350, 370 or through a type of track fasteners 430 used to fasten the bipod 310 and the stay 250 to the track member(s) 420.

In some embodiments, the distal ends 328 of each of the first support 312a and the second support 312b are connected with an anchor 462 to a safety cable 460 configured to restrict movement of the bipod 310 in case of unintentional release of the track fasteners 430. For example, the safety cable 460 may be connected through the second rail 370. In other embodiments, each of the first support 312a and the second support 312b are connected to separate anchoring points at the ends of respective track members 410.

In some embodiments, the stay 250 is connected at a first end to the bipod 310, and at a second end to the second rail 370. The first end of the stay 250 may be connected to a joiner clevis 316 of the bipod 310 using, for example, a quick release pin 284 (e.g., pit pin). In another example, the first end of the stay 250 may be secured to the joiner clevis 316 by a nut and bolt fastener 315.

The tie rod 270, in some embodiments, connects the bipod 310 to the upper aircraft structure. In some examples, the upper aircraft structure may include overhead fixed points on an aircraft fuselage such as a cabin ceiling and bulkhead as well as sides of the aircraft fuselage and bulkhead walls. A length of the stay 250 may be adjustable, such that the stay 250 has at least one adjustable end, such as described for the tie rod 270 below. As shown in FIGS. 3A and 4, the stay 250 is configured to resist loads in the x direction. In an example, the stay 250 can include a first connector 252 configured to secure the stay 250 to the joiner clevis 316 and a second connector 254 configured to secure the stay 250 to the gap 371 of the second rail 370. In an example, the first connector 252 and the second connector 254 can be adjusted to lengthen the stay 250. In an example, the stay 250 can include a first connector 252 configured to secure the stay 250 to the joiner clevis 316 and a bracket 440 configured to secure the stay 250 to at least one rail 372a-b of the second rail 370.

The first rail 350 may be positioned along a y-axis of the top panel 206 of the galley monument 101 according to an example. Similarly, the second rail 370 may be repositioned along a y-axis of the top panel 206. The position of the first rail 350 may be adjustable relative to the position of the second rail 370 along the x-axis of the top panel 206, for example, by connecting to fixed locations along the y-axis separated by increments of approximately one centimeter, two centimeters, three centimeters, and/or one inch. In another example, the second rail 370 is located in a fixed position relative to the plate 210 or top panel 206. The bipod 310 and the stay 250 may each be relocated along a y-axis of the monument 101 along lengths of the first duplex rail 350 and the second duplex rail 370, respectively. Connections between the bipod 310 and the first rail 350, and between the stay 250 and the second rail 370 may be secured by a number of connectors, for example, a pit pin 284, at each connection.

In one example, a first end of the stay 250 may be connected to the bipod 310, and a second end of the stay 250 may be connected to the second rail 370, with each of the first and second ends of the stay 250 secured by a fastener such as a quick release pin 284 allowing for quick removal and installation of components without the need of tools.

Figure 5A:
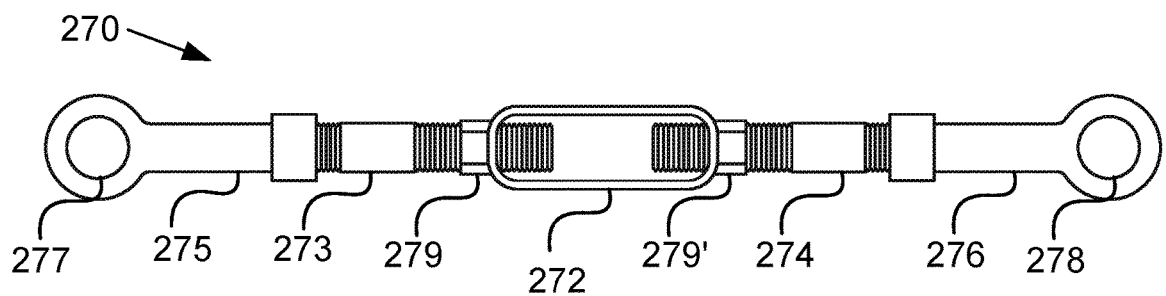
FIGS. 5A-5B illustrate various views of a tie rod configured to connect the monument to an upper attachment point of the aircraft according to an example.
Figure 5B:
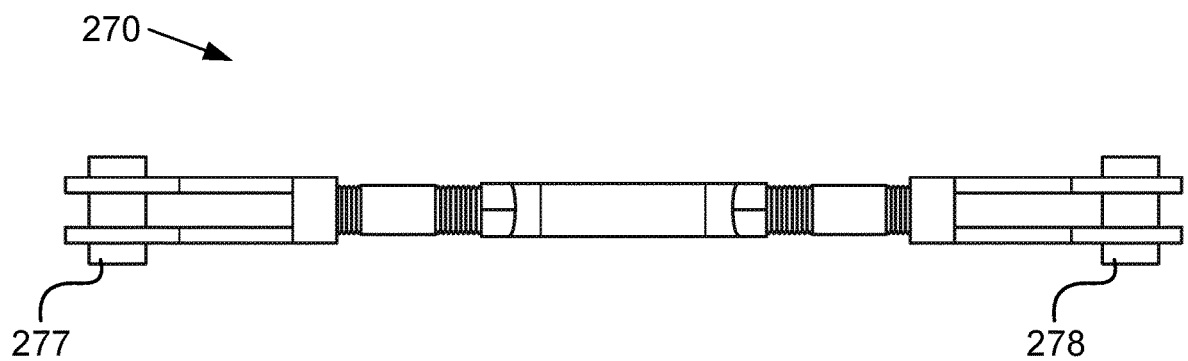

Turning to FIGS. 5A and 5B, the tie rod 270, as illustrated, may include a first stud 273 connected to a first end of a body 272 by a threaded joint having a first internally threaded member 279 (e.g., nut), and a second stud 274 may be connected to a second end of the body 272 by a threaded joint having a threaded member 279'. The body 272, in some implementations, is formed as an annular member. For example, the body 272 may be a tube or cylinder. In other implementations, the body 272 includes a solid interior portion (e.g., a rod, shaft, or stub portion). In some embodiments, the body 272 is rigidly formed. In other embodiments, a portion of the body 272 includes compressible material, such that the body 272 may function as a shock absorber.

A second end of the first stud 273 may also have a threaded connection with a first end of a first clevis 275. A second end of the second stud 274 may also have a threaded connection with a first end of a second clevis 276. A clevis pin 277 (eye bearing) may be connected through approximately the second end of the first clevis 275, and a clevis pin 278 (eye bearing) may be connected through approximately the second end of the second clevis 276. In an aspect, connection between the attachment aperture 318 of the bipod 310 and the clevis pin 278 of the tie rod 270 allows for expected vertical movements of the monument 101 relative to the aircraft.

At least one end of the tie rod 270, as illustrated in FIG. 3B, may have the clevis pin 278, for example, to connect with the bipod 310 and allow the tie rod 270 to rotate and pivot about the bipod 310 and adjust such that the second end of the tie rod 270 may connect to various mounting points on the upper cabin structure(s).

The tie rod 270 may be adjustable for angular position about a first end connected to the bipod 310, for angular position about a longitudinal axis at each of a first and a second end of the tie rod 270, and along a length of the tie rod 270. Thus the tie rod 270 may be adjustable relative to the bipod 310 about at least one axis and in at least one plane.

Each component of the upper monument attachment system 160 may be subjected to various compressive loads, tensile loads, or bending loads as a result of counteracting corresponding loads the monument 101 may be subjected to during operation of the aircraft.

In an example, the loads can be configured to withstand G-forces including weight of a fully loaded monument (e.g., FORWARD 9 g, REAR 2.9 g, LEFT 3 g, RIGHT 3 g, DOWN 6.7 g, UP 3.7 g).

In one example, mounting of the upper monument attachment system 160 may include the steps of connecting a plate 210 to a top panel 206 of a galley monument, for example a monument 101, connecting rails 350, 370 to the track member(s) 420, mounting a bipod 310 on the first rail 350, mounting a stay 250 on the second rail 370, connecting the stay 250 and the bipod 310, and then attaching a tie rod 270 to the bipod.

Adjustments to the upper monument attachment system 160 may include separately varying a location of at least one of the rails 350, 370 within the track member(s) 420, relocating a position of the bipod 310 and/or the stay 250 within corresponding rails 350, 370, adjusting a length of the stay 250, adjusting a position of the tie rod 270 relative to the bipod 310, and varying a length of the tie rod 270.

While the exemplary implementation is illustrated with the galley monument 101, one skilled in the art will recognize the upper monument attachment system 160, 400 may be used on a variety of galley monuments and aircraft structures.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An upper monument attachment system for retaining an aircraft monument, comprising:
    a first support, a second support, and a joiner connecting a first end of the first support and a first end of the second support;
    a stay having a first end pivotably connected to the joiner of the first support and the second support;
    a tie rod configured to connect the joiner to an attachment point of the aircraft;
    a first rail having a first base configured to connect to an upper surface of the aircraft monument and a first facing configured to connect to the first support and the second support;
    a second rail having a second base configured to connect to the upper surface of the aircraft monument and a second facing configured to connect to a second end of the stay; and
    a plate connected to the upper surface of the aircraft monument, wherein the first rail and the second rail are secured to the plate;
    wherein the second rail is separated from the first rail and parallel to the first rail; and
    wherein the first support, the second support, and the stay are collectively configured to form a triangulated support.

2. The upper monument attachment system of claim 1, wherein the tie rod includes a shock absorber.

3. The upper monument attachment system of claim 1, wherein connections between the first support and the first rail, between the second support and the first rail, and between the stay and the second rail are secured by a plurality of quick-release fasteners.

4. The upper monument attachment system of claim 1, wherein the triangulated support is configured to maximize strength and rigidity per unit mass.

5. The upper monument attachment system of claim 1, wherein the upper monument attachment system is configured to remove at least a portion of a load supported by a lower monument disposed beneath and abutting the aircraft monument.

6. The upper monument attachment system of claim 1, wherein: the second rail is a duplex rail having a gap along a length of the second rail, wherein the second end of the stay is configured to be secured within the gap of the second rail.

7. The upper monument attachment system of claim 6, wherein the first rail is a duplex rail having a gap along a length of the first rail, wherein a second end of the first support and a second end of the second support are each configured to be secured by the first rail.

8. The upper monument attachment system of claim 1, wherein the attachment point includes a shock absorber configured to allow for a controlled range of motion of at least an upper portion of the aircraft monument.

9. The upper monument attachment system of claim 1, wherein the first support and the second support are fixed via the joiner to form a bipod, and the stay is connectable to the bipod forming a tripod.

10. The upper monument attachment system of claim 9, further comprising a grounding cable connected to the bipod.

11. The upper monument attachment system of claim 1, wherein the first support and the second support are pivotally connected via the joiner forming, with the stay, an adjustable tripod.

12. The upper monument attachment system of claim 1, wherein components of the upper monument attachment system are electrically bonded together to provide a low resistance path from the aircraft monument to an electrical ground.

13. The upper monument attachment system of claim 1, wherein the attachment point of the aircraft includes at least one of an aircraft fuselage, a cabin ceiling, and a bulkhead.

14. The upper monument attachment system of claim 1, further comprising at least one track member, wherein the first rail is connected to the at least one track member using a plurality of track fasteners allowing a distance of separation between the first rail and the second rail to be adjusted by moving the first rail along a length of the least one track member.

15. The upper monument attachment system of claim 14, wherein the at least one track member comprises a plurality of depressions, and
    wherein each track fastener includes a spring mechanism configured to mate with one of the plurality of depressions in the at least one track member such that, upon positioning, the spring mechanism is engaged to lock the first rail into position.

16. An upper monument attachment system for retaining an aircraft monument, comprising:
    three supports forming an adjustable tripod, wherein at least a first support is pivotally connected to a second support and a third support of the three supports;
    a tie rod configured to connect the adjustable tripod to an attachment point of the aircraft;
    a first rail having a first base configured to connect to an upper surface of the aircraft monument and a first facing configured to connect to the first support of the three supports; and
    a second rail having a second base configured to connect to the upper surface of the aircraft monument and a second facing configured to connect to remaining supports of the three supports;
    wherein the second rail is separated from the first rail and parallel to the first rail;
    wherein components of the upper monument attachment system are electrically bonded together to provide a low resistance path from the aircraft monument to an electrical ground; and at least one track member, wherein the first rail is connected to the at least one track member using a plurality of track fasteners allowing a distance of separation between the first rail and the second rail to be adjusted by moving the first rail along a length of the least one track member.

17. The upper monument attachment system of claim 16, wherein a first support of the three supports and a second support of the three supports are fixed via a joiner to form a bipod, and a third support of the three supports is connectable to the bipod forming a tripod.

18. The upper monument attachment system of claim 16, further comprising a grounding cable connected to a joiner joining at least two of the three supports.

\* \* \* \* \*